(12) United States Patent
Zhou et al.

(10) Patent No.: US 10,267,008 B2
(45) Date of Patent: Apr. 23, 2019

(54) OFFSHORE NON-DRIVEN-IN LARGE-DIAMETER MONOPILE FOUNDATION STRUCTURE AND CONSTRUCTION METHOD

(71) Applicant: PowerChina Huadong Engineering Corporation Limited, Hangzhou, Zhejiang (CN)

(72) Inventors: Hu Zhou, Zhejiang (CN); Na Lv, Zhejiang (CN); Haifeng Qi, Zhejiang (CN); Jinping Luo, Zhejiang (CN); Xingjian Sun, Zhejiang (CN); Danshan Wang, Zhejiang (CN); Hongbao Rong, Zhejiang (CN); Jinning Shen, Zhejiang (CN); Ning Liang, Zhejiang (CN)

(73) Assignee: PowerChina Huadong Engineering Corporation Limited, Hangzhou (CN)

( * ) Notice: Subject to any disclaimer, the term of this patent is extended or adjusted under 35 U.S.C. 154(b) by 0 days.

(21) Appl. No.: 15/958,578

(22) Filed: Apr. 20, 2018

(65) Prior Publication Data
US 2018/0340312 A1  Nov. 29, 2018

(30) Foreign Application Priority Data
May 25, 2017  (CN) .......................... 2017 1 0380199

(51) Int. Cl.
*E02D 27/12* (2006.01)
*E02D 27/42* (2006.01)
(Continued)

(52) U.S. Cl.
CPC ........... *E02D 27/425* (2013.01); *E02D 27/12* (2013.01); *E02D 27/525* (2013.01); *E02D 29/06* (2013.01);
(Continued)

(58) Field of Classification Search
CPC ..... E02D 27/425; E02D 27/12; E02D 27/525; E02D 29/06; F03D 13/25; E02B 2017/0091
See application file for complete search history.

(56) References Cited

U.S. PATENT DOCUMENTS 3,604,214 A * 9/1971 Turzillo ................. E02D 3/106
                                                              175/323
3,916,634 A * 11/1975 Woodruff .................. E02D 7/24
                                                              175/205

(Continued)

*Primary Examiner* — Benjamin F Fiorello
(74) *Attorney, Agent, or Firm* — Wayne & Ken, LLC; Tony Hom

(57) ABSTRACT

The present invention relates to an offshore non-driven-in large-diameter monopile foundation structure and a construction method. An object of the invention is to provide an offshore non-driven-in large-diameter monopile foundation structure with simple structure, convenient construction and clear mechanic behavior, and a construction method. The technical solution adopted by the invention is as follows: an offshore non-driven-in large-diameter monopile foundation structure suitable for rock foundations is characterized in that a drilling hole is drilled in a rock foundation, a large-diameter monopile is implanted into the drilling hole, the bottom of the large-diameter monopile is sealed by underwater bottom-sealing concrete, and the gap between the outer wall of the large-diameter monopile and the hole wall of the drilling hole is filled with a grouting material goofed by a grouting system that is preset inside the large-diameter monopile. The invention is applied to offshore wind power and other industries.

13 Claims, 9 Drawing Sheets

(51) Int. Cl.
*E02D 27/52* (2006.01)
*E02D 29/09* (2006.01)
*F03D 13/25* (2016.01)
*E02B 17/00* (2006.01)

(52) U.S. Cl.
CPC ...... *F03D 13/25* (2016.05); *E02B 2017/0091* (2013.01)

(56) References Cited

U.S. PATENT DOCUMENTS

| | | | | |
|---|---|---|---|---|
| 4,014,174 | A * | 3/1977 | Mondshine | E02D 5/36 166/292 |
| 4,133,396 | A * | 1/1979 | Tschirky | E21B 4/02 175/107 |
| 4,904,119 | A * | 2/1990 | Legendre | E02D 17/13 405/228 |
| 5,082,499 | A * | 1/1992 | Shen | C04B 28/02 106/735 |
| 5,275,511 | A * | 1/1994 | Pelletier | C04B 28/08 106/707 |
| 6,102,119 | A * | 8/2000 | Raines | E21B 7/20 166/207 |
| 8,517,639 | B2 * | 8/2013 | Gibberd | E02D 5/40 405/224 |
| 9,891,133 | B2 * | 2/2018 | Sun | G01M 5/0058 |
| 2011/0170956 | A1 * | 7/2011 | Vandenbulcke | E02D 27/42 405/227 |
| 2013/0259581 | A1 * | 10/2013 | Li | E02B 17/0008 405/225 |
| 2017/0362792 | A1 * | 12/2017 | Chen | E02D 9/02 |

* cited by examiner

OFFSHORE NON-DRIVEN-IN LARGE-DIAMETER MONOPILE FOUNDATION STRUCTURE AND CONSTRUCTION METHOD

TECHNICAL FIELD

The present invention relates to an offshore non-driven-in large-diameter monopile foundation structure and a construction method, which are applied to offshore wind power and other industries.

BACKGROUND ART

With the development of renewable energy technologies, offshore wind energy, as an important trend of wind energy development, has got a rapid development with the features of no occupation of land resources, high wind speed, short distance from load consumption centers and the like.

The infrastructure for offshore wind power, as a bridge connecting a wind turbine generator tower and ground, bears the combined action of wind, wave and current and other complex cyclic environmental loads, and its structural design and construction method are one of the key technical difficulties in offshore wind power exploitation and construction. The structure of conventional high pile bearing platform has the problems of poor pile stability in rock foundation areas, long construction period of auxiliary measures, high cost and high structural safety risk. However, the application of non-driven-in monopile foundation structures may take full advantage of high horizontal bearing capacity of weathered rock, low steel consumption, rapid construction speed and low construction cost. Further, with regard to the current situation of global offshore wind power exploitation, the large-diameter monopile structure is known for simple structure form, definite load transfer path and convenient construction and installation, and become the most popular wind turbine foundation structure form. However, there is still no experience of implementing non-driven-in large-diameter piles in rock foundation areas.

For bed rocks with shallow buried depth in coastal areas of Fujian and Guangdong provinces in China, a large-diameter monopile cannot be self-stabilized, or although the pile body can be self-stabilized using auxiliary measures, a large-diameter monopile cannot be driven in with a hydraulic pile hammer. Although the pile making technology, equipment and pile driving performance are constantly improved, for such geological conditions, the conventional large-diameter monopile construction technology cannot met the design requirements.

SUMMARY OF THE INVENTION

The technical problem to be solved by the present invention is that, for the existing problems mentioned above, the invention provides an offshore non-driven-in large-diameter monopile foundation structure with simple structure, convenient construction and clear structural behavior, and a construction method, aiming to improve the application of large-diameter monopile foundations, improve the offshore construction efficiency of wind turbine foundations under complex geological conditions, and take full advantage of horizontal bearing capacity of large-diameter monopile under rock conditions, thereby improving overall stability of the foundation structure.

The technical solution adopted by the invention is as follows: an offshore non-driven-in large-diameter monopile foundation structure suitable for rock foundations is characterized in that a drilling hole is drilled in a rock foundation, then a large-diameter monopile is implanted into the drilling hole, the bottom of the large-diameter monopile is sealed by underwater bottom-sealing concrete, and a gap between the outer wall of the large-diameter single pile and the hole wall of the drilling hole is filled with a grouting material that is grouted in a grouting system preloaded inside the large-diameter monopile.

The grouting system is comprised of a plurality of horizontal grouting pipes fixed to the outer wall of the lower part of the large-diameter monopile, and a plurality of vertical grouting pipes fixed uniformly to the inner wall of the large-diameter monopile and extending from the upper end of the large-diameter single pile to the corresponding positions of the horizontal grouting pipes; the vertical grouting pipes are connected to the horizontal grouting pipes via holes on the pile, and the horizontal grouting pipes are provided with a plurality of slurry overflow ports.

The horizontal grouting pipes are formed by combining angle steel or ¼ circular pipes with the outer wall of the large-diameter monopile.

The lower edges of the angle steel or ¼ circular pipes are connected with the outer wall of the large-diameter monopile by continuous welding; the upper edges of the angle steel or ¼ circular pipes are connected with the outer wall of the large-diameter monopile by discontinuous welding, and the plurality of slurry overflow ports are formed on the upper edges of the angle steel or ¼ circular pipes and the outer wall of the monopile.

The vertical grouting pipes are formed by combining angle steel or ¼ circular pipes with the inner wall of the large-diameter single pile.

The grouting material satisfies the following requirements: resistance to water dispersibility, setting time of more than 5 hours, and the maximum aggregate size less than 5 mm.

The diameter of the drilling hole is 100-300 mm larger than the diameter of the pile.

The large-diameter monopile is sleeved with a steel casing; a lower end of the steel casing is sunk into the rock foundation, and the steel casing is integrated with a construction platform fixed on the rock foundation.

A construction method of offshore non-driven-in large-diameter monopile foundation structure is provided, characterized by the steps of:

a. building a construction platform on a rock foundation;

b. sinking a lower end of a steel casing into the rock foundation; integrating the steel casing and the construction platform into a whole;

c. setting a driller body at an upper end of the steel casing, enabling the rock-socketed driller bit of the driller body to drill in the rock foundation corresponding to the steel casing through an inner passage of the steel casing until reaching a design elevation;

d. removing rock debris from the drilling hole and implanting the prefabricated large-diameter monopile with a grouting system in the drilling hole;

e. pouring underwater bottom-sealing concrete at the bottom of the large-diameter monopile, and after the underwater bottom-sealing concrete is solidified, grouting the gap between the outer wall of the large-diameter single pile and the hole wall of the drilling hole through the grouting system;

f. removing the construction platform and the steel casing.

The invention has the following advantages: the structure is simple, the construction is convenient, and the large-diameter monopile foundation can be applied for the first time to the complex geological conditions that the pile body cannot be self-stabilized and cannot be directly driven by a pile hammer; compared with the conventional large-diameter monopile construction technology, a large-energy hydraulic pile hammer is not needed, inhence reducing the construction noise and ensuring environmental friendliness. In the invention, the large-diameter monopile is fixed on the rock foundation by implanting the pile after hole drilling, which is simple and convenient in operation and increases the construction efficiency. By grouting from bottom to top using the grouting system preset in the pile, the compactness of the space between the pile and the rock is ensured, and the horizontal bearing capacity and the stability of the foundation overall structure are improved. A plurality of slurry overflow ports are formed by discontinuous welding, which is convenient and rapid with low cost. After grouting, the horizontal grouting pipes on the outer wall of the large-diameter single pile increase the contact area between the large-diameter single pile and the grouting material, which helps improve the overall stability of the foundation structure.

DETAILED DESCRIPTION OF THE INVENTION

Figure 1:
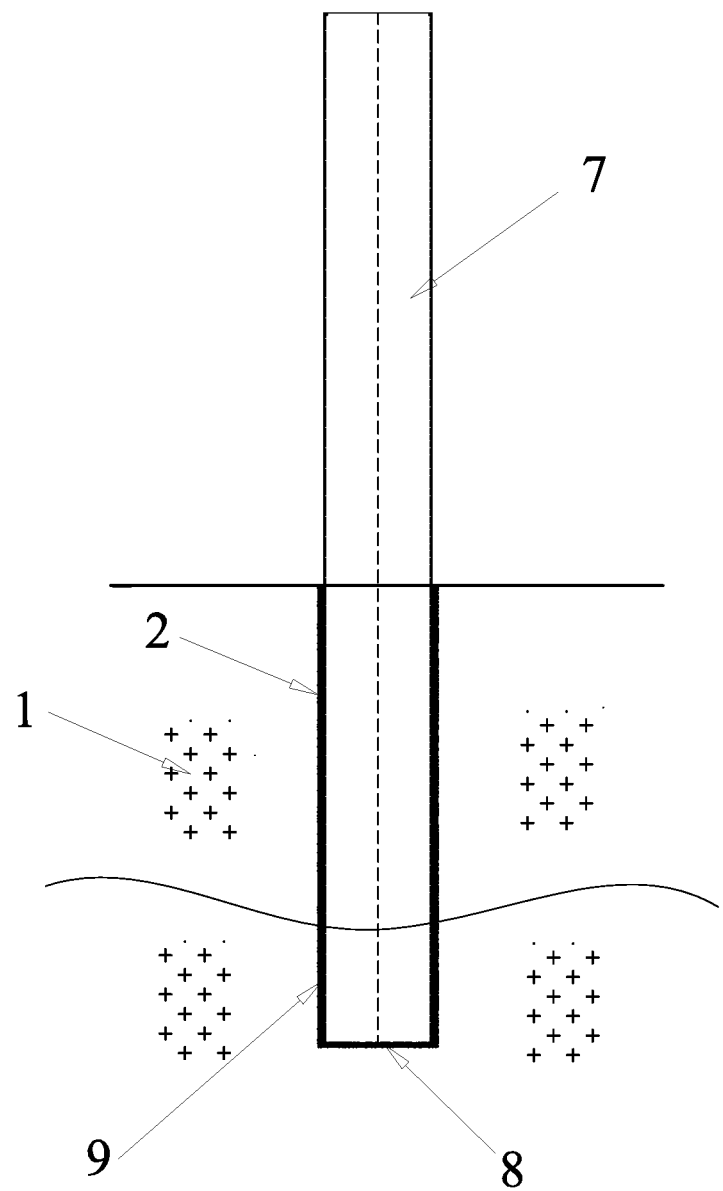
FIG. 1 is a schematic structural view of the example.

As shown in FIG. 1, in this example, an offshore non-driven-in large-diameter monopile foundation structure is provided, comprising a large-diameter monopile 7 with a diameter of 4.0-8.0 m, and a drilling hole 2 drilled on a rock foundation 1, the diameter of the drilling hole 2 is 100-300 mm larger than the diameter of the large-diameter monopile 7, and the large-diameter monopile 7 is implanted in the drilling hole 2. Underwater bottom-sealing concrete 8 is poured at the bottom of the large-diameter monopile 7, the gap between the outer wall of the large-diameter single pile 7 and the hole wall of the drilling hole 2 is filled with grouting material grouted by a grouting system built inside the large-diameter single pile, and the grouting material satisfies the following requirements: resistance to water dispersibility, setting time of more than 5 hours, and the maximum aggregate size of less than 5 mm.

Figure 2:
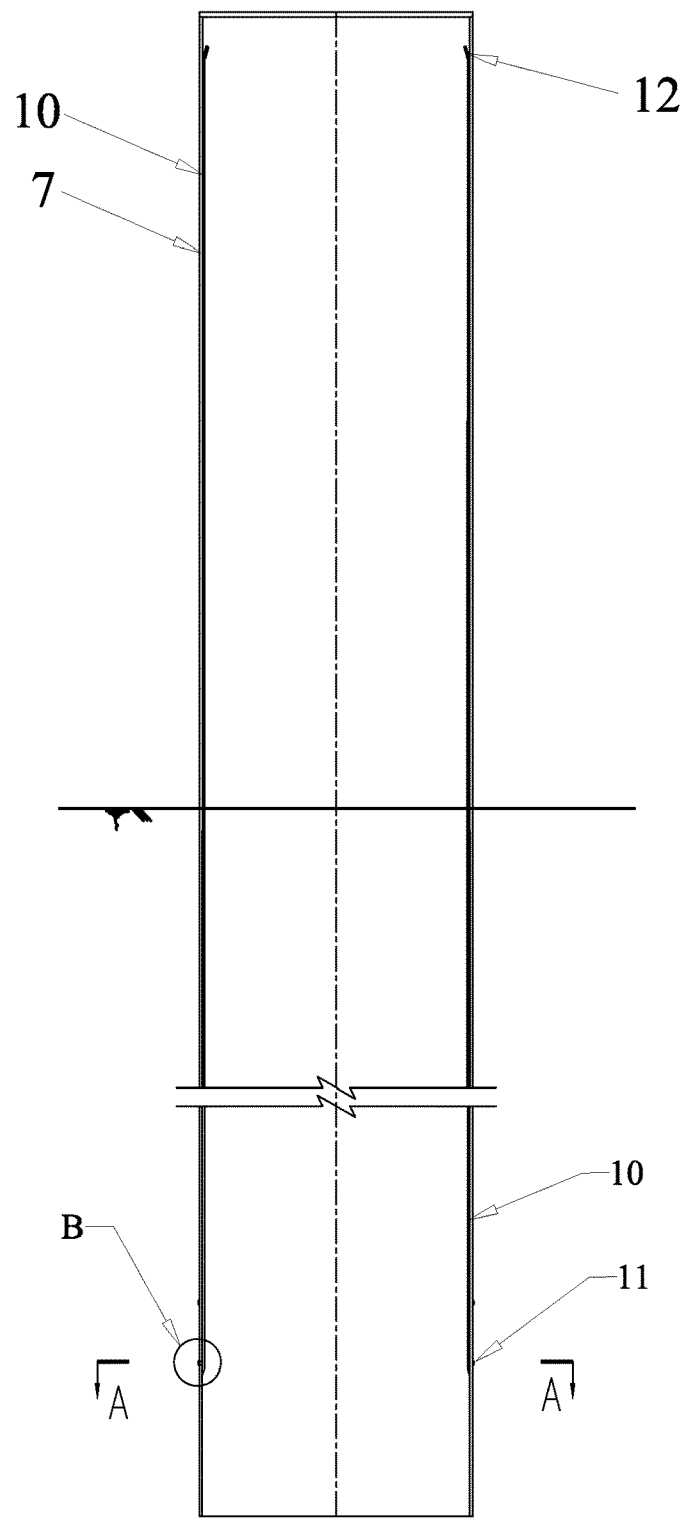
FIG. 2 is a schematic structural view of a grouting system in the example.
Figure 3:
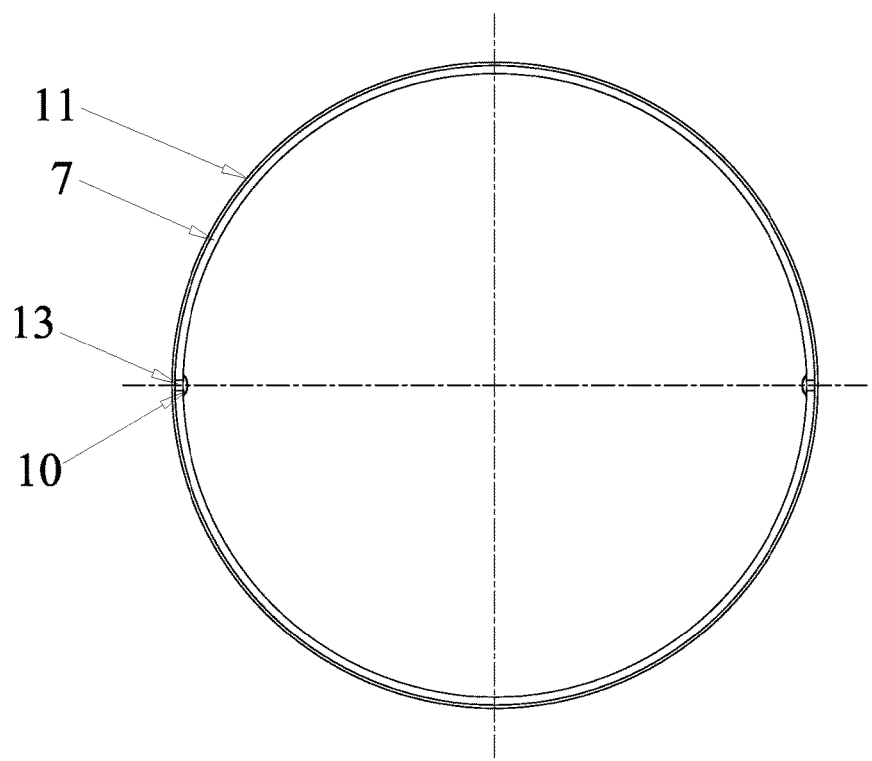
FIG. 3 is a cross-sectional view taken along line A-A in FIG. 2.
Figure 4:
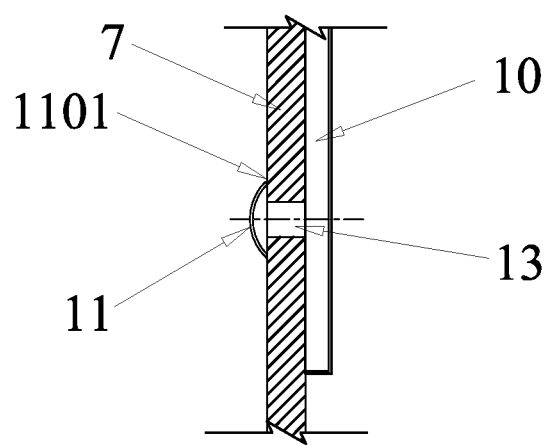
FIG. 4 is an enlarged schematic view of part B of FIG. 2.

As shown in FIG. 2-FIG. 4, in this example, the grouting system is comprised of two vertical grouting pipes 10 and two horizontal grouting pipes 11, the horizontal grouting pipes 11 are located at the lower part of the large-diameter monopile 7 and formed by enclosing ¼ circular pipes that surround the outer wall of the large-diameter monopile 7 with the outer wall of the monopile, the lower edges of the ¼ circular pipes are connected with the outer wall of the large-diameter monopile by continuous welding and the upper edges of the ¼ circular pipes are connected with the outer wall of the large-diameter monopile by discontinuous welding, so that a plurality of slurry overflow ports 1101 are formed between the upper edges of angle steel or the ¼ circular pipes and the outer wall of the large-diameter monopile; the vertical grouting pipes 10 are formed by enclosing ¼ circular pipes that are arranged in the axial direction of the large-diameter monopile 7 and extend from the upper end of the large-diameter monopile 7 to the corresponding positions of the horizontal grouting pipes 11 with the inner wall of the pile, the ¼ circular pipes are directly welded and fixed to the inner wall of the large-diameter monopile 7, with the top welded to the inner wall of the large-diameter monopile 7 by a reinforcement plate 12. In this example, holes 13 connecting the vertical grouting pipes 10 with the horizontal grouting pipes 11 are provided on the large-diameter monopile 7 and the intersection of the vertical grouting pipes 10 and the horizontal grouting pipes 11. In this example, the grouting material 9 can enter the horizontal grouting pipes 11 through the holes 13 along the vertical grouting pipes 10, and the grouting material 9 flows into the gap between the large-diameter single pile 7 and the drilling hole 2 through the slurry overflow ports 1101.

The particular construction method of this example is as follows:

The material selection, form selection, processing and assembly of the large-diameter monopile 7 are completed on land before pile sinking. The grouting system is arranged in the inner and outer sides of the single pile. The feasibility or remedial measures for the construction platform 3 and the steel casing 4 and the stability of the construction platform 3 and the steel casing 4 during the drilling process need to be analyzed and determined before construction.

'Building-Drilling-Implanting-Grouting-Removing' Construction

Figure 5:
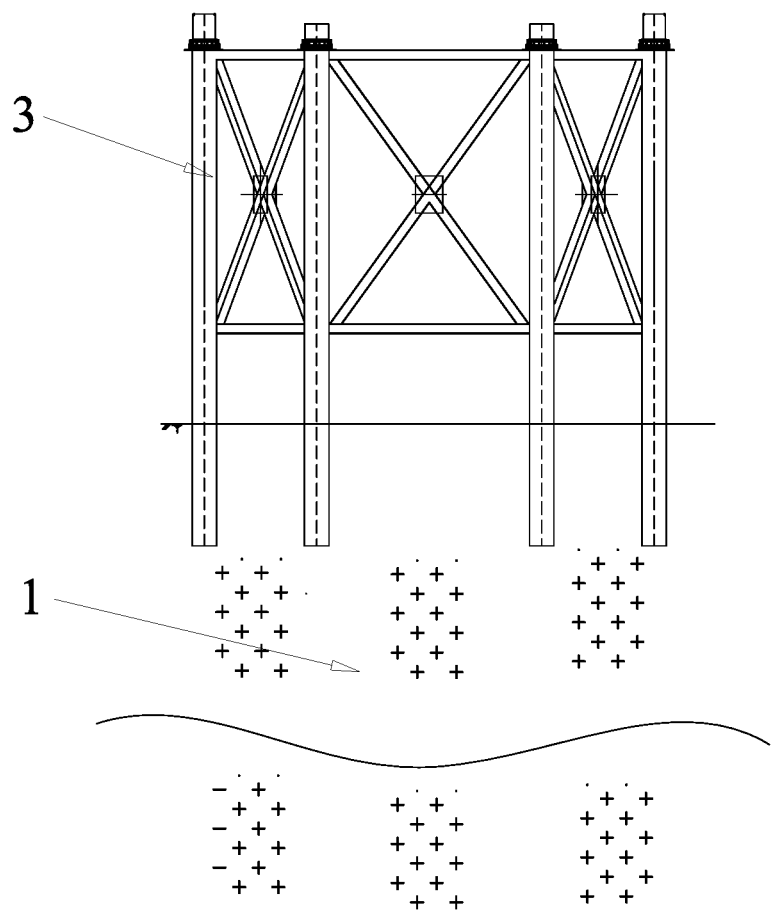
FIGS. 5~9 schematically show a construction process of the example.

Construction step a: the construction platform 3 is built on the rock foundation 1, and the construction platform 3, as an assistant platform for construction, can be provided with a drilling pipe, a power station, a power generator and other equipment (see FIG. 5).

Figure 6:
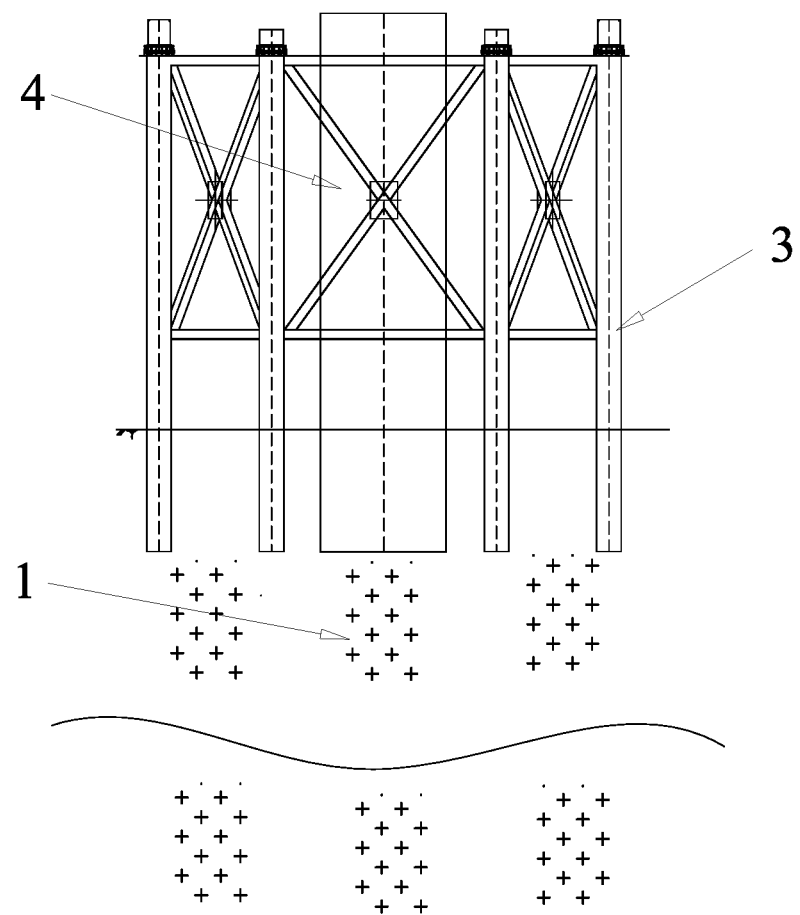

Construction step b: the lower end of the steel casing 4 is sunk into the rock foundation 1, and the steel casing 4 can be integrated with the construction platform 3 as a whole, so as to protect against the influence of wave loads and vibration loads of the driller on the pile body verticality (See FIG. 6).

Figure 7:
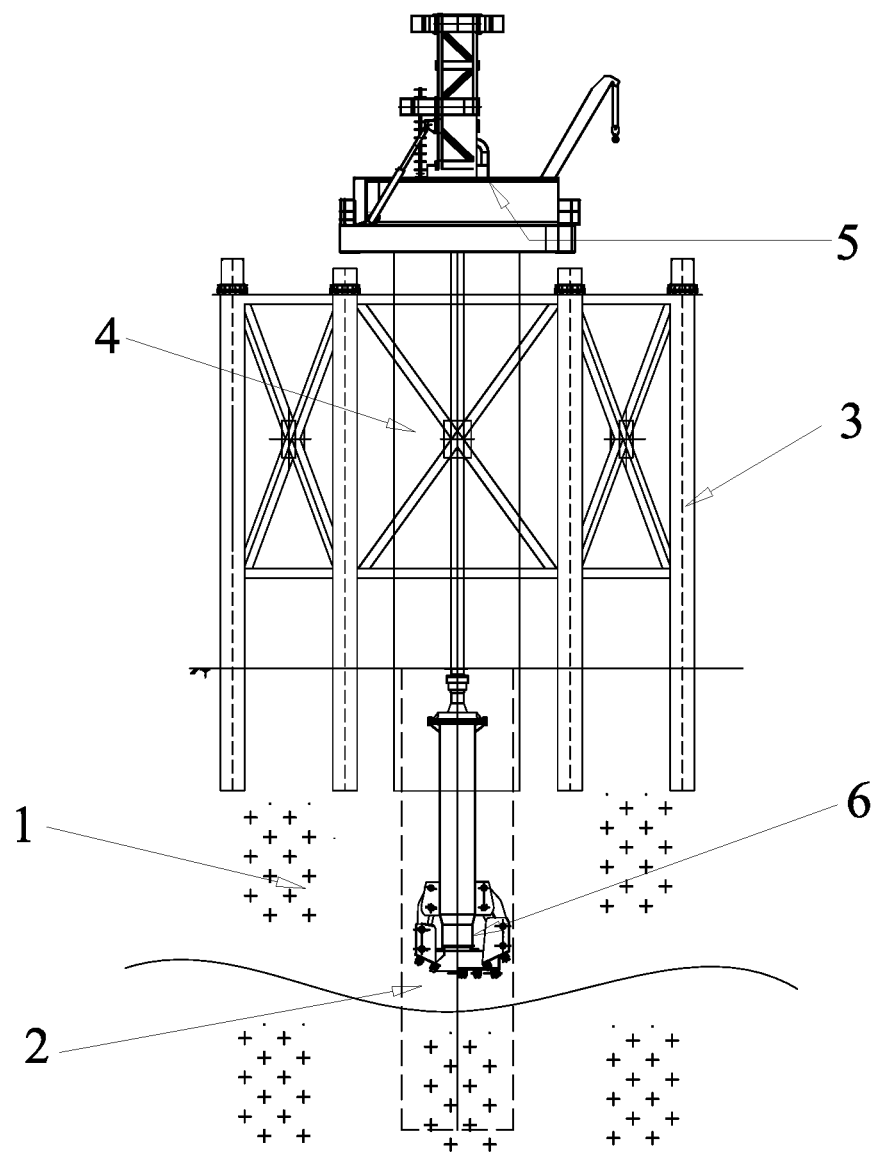

Construction step c: the driller body 5 is provided at the top of the steel casing 4, the rock-socketed driller bit 6 of the driller body 5 is enabled to drill in the rock foundation 1 corresponding to the steel casing through the inner passage of the steel casing 4 until reaching the design elevation, thereby forming the drilling hole 2 (See FIG. 7). By adjusting the size of the rock-socketed driller bit 6, the diameter of the drilling hole may be greater than the diameter of the pile, and the size can be adjusted properly according to the practical need for drilling.

Figure 8:
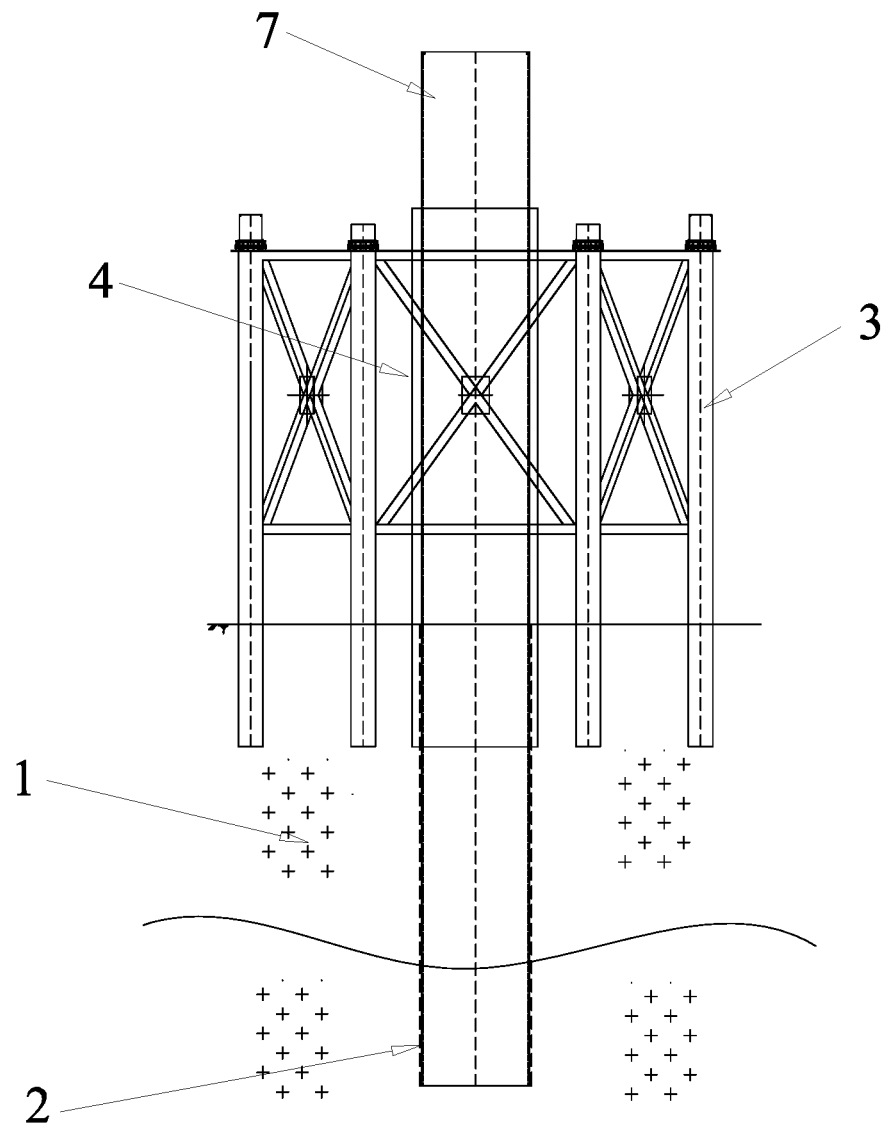

Construction step d: the rock debris is removed from the drilling hole 2, and the large-diameter monopile 7 which is prefabricated and arranged with the grouting system is implanted (See FIG. 8).

Figure 9:
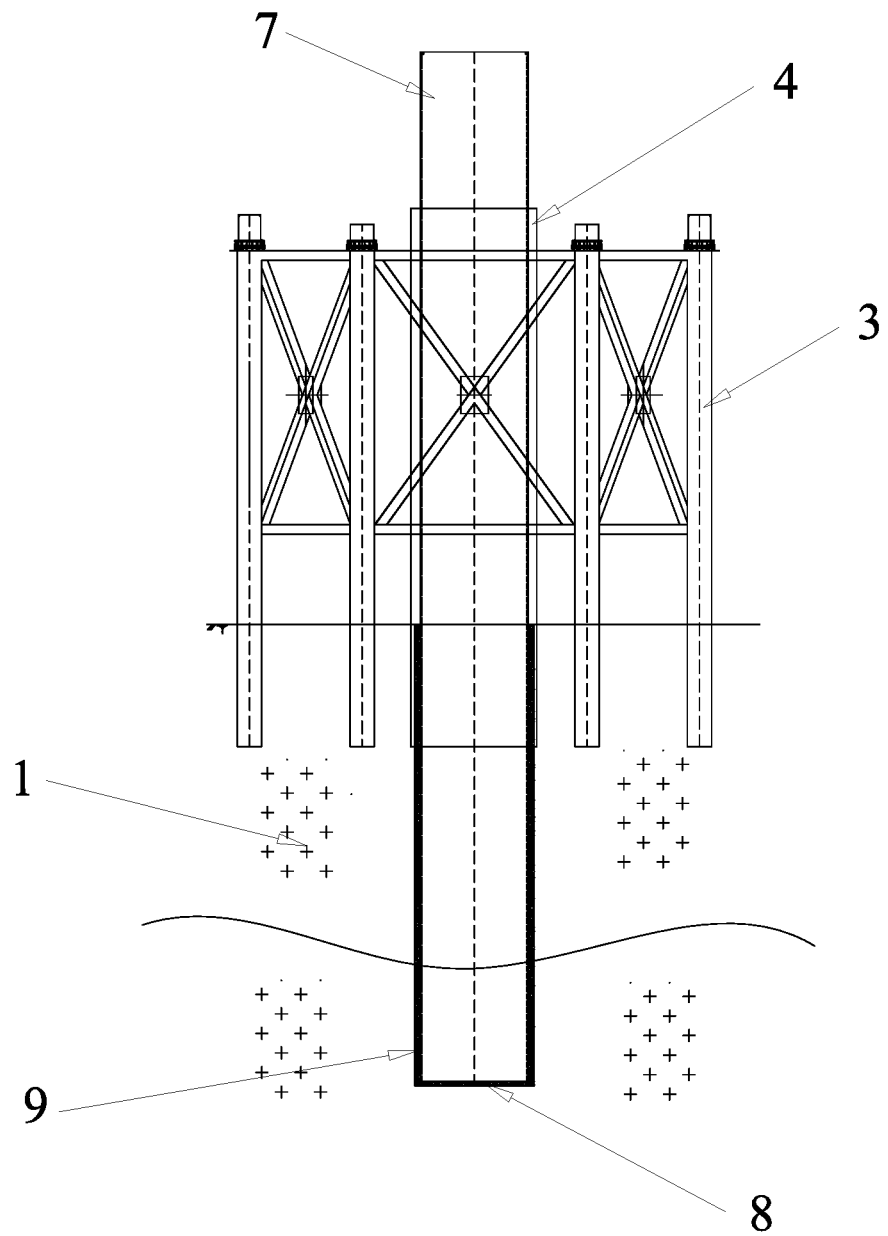

Construction step e: temporary measures are adopted to ensure that the verticality of the large-diameter monopile 7 satisfies the design requirements, and then underwater bottom-sealing concrete 8 is poured at the bottom of the pile, after the underwater bottom-sealing concrete 8 is solidified, the gap between the side wall of the large-diameter monopile 7 and the drilling hole 2 is grouted through the grouting system (See FIG. 9).

Construction step f: the construction platform 3 and the steel casing 4 are removed (See FIG. 1), which can be recycled.

The foregoing example and construction process are mainly applied to offshore wind power projects. However, the invention is not limited thereto, and other foundation structures involving port and coastal engineering and offshore engineering may also be designed and constructed using the technical solution provided in the present invention.

What is claimed is:

1. An offshore non-driven-in monopile foundation structure suitable for rock foundations, comprising:
   a drilling hole drilled in a rock foundation, the monopile implanted into the drilling hole, an underwater bottom-sealing concrete sealing a bottom of the monopile, and a grouting material filling a gap between an outer wall of the monopile and a hole wall of the drilling hole; wherein the grouting material is grouted by a grouting system preset inside the monopile;
   the grouting system comprises a plurality of horizontal grouting pipes fixed to an outer wall of a lower part of the monopile, and a plurality of vertical grouting pipes fixed uniformly to an inner wall of the monopile and extending from an upper end of the monopile to corresponding positions of the horizontal grouting pipes; the vertical grouting pipes are connected to the horizontal grouting pipes via holes on the monopile, and there are a plurality of slurry overflow ports arranged on the horizontal grouting pipes.

2. The offshore non-driven in monopile foundation structure according to claim 1, wherein, the horizontal grouting pipes are formed by combining angle steel or ¼ circular pipes with the outer wall of the monopile.

3. The offshore non-driven in monopile foundation structure according to claim 2, wherein, lower edges of the angle steel or ¼ circular pipes are connected with the outer wall of the monopile by continuous welding; upper edges of the angle steel or ¼ circular pipes are connected with the outer wall of the monopile by discontinuous welding and the plurality of slurry overflow ports are formed by the upper edges of the angle steel or ¼ circular pipes and the outer wall of the monopile.

4. The offshore non-driven in monopile foundation structure according to claim 1, wherein, the vertical grouting pipes are formed by combining angle steel or ¼ circular pipes with the inner wall of the monopile.

5. The offshore non-driven in monopile foundation structure according to claim 1, wherein, the grouting material satisfies the following requirements: resistance to water dispersibility, setting time of more than 5 hours, and maximum aggregate size of less than 5 mm.

6. The offshore non-driven in monopile foundation structure according to claim 1, wherein, a diameter of the drilling hole is 100 mm larger than a diameter of the monopile.

7. The offshore non-driven in monopile foundation structure according to claim 1, wherein, the monopile is sleeved with a steel casing; a lower end of the steel casing is sunk into the rock foundation, and the steel casing is integrated with a construction platform fixed on the rock foundation.

8. A construction method of the offshore non-driven in monopile foundation structure of claim 1, comprising:
   a. building a construction platform on a rock foundation;
   b. sinking a lower end of a steel casing into the rock foundation; integrating the steel casing and the construction platform into a whole;
   c. setting a driller body at an upper end of the steel casing, enabling a rock-socketed driller bit of the driller body to drill in the rock foundation corresponding to the steel casing through an inner passage of the steel casing until reaching a design elevation;
   d. removing rock debris from the drilling hole and implanting the monopile prefabricated and arranged with a grouting system in the drilling hole;
   e. pouring underwater bottom-sealing concrete at the bottom of the monopile, and after the underwater bottom-sealing concrete is solidified, grouting the gap between the outer wall of the monopile and the hole wall of the drilling hole through the grouting system;
   f. removing the construction platform and the steel casing.

9. A construction method of the offshore non-driven in monopile foundation structure of claim 2, comprising:
   a. building a construction platform on a rock foundation;
   b. sinking a lower end of a steel casing into the rock foundation; integrating the steel casing and the construction platform into a whole;
   c. setting a driller body at an upper end of the steel casing, enabling a rock-socketed driller bit of the driller body to drill in the rock foundation corresponding to the steel casing through an inner passage of the steel casing until reaching a design elevation;
   d. removing rock debris from the drilling hole and implanting the monopile prefabricated and arranged with a grouting system in the drilling hole;
   e. pouring underwater bottom-sealing concrete at the bottom of the monopile, and after the underwater bottom-sealing concrete is solidified, grouting the gap between the outer wall of the monopile and the hole wall of the drilling hole through the grouting system;
   f. removing the construction platform and the steel casing.

10. A construction method of the offshore non-driven in monopile foundation structure of claim 3, comprising:
    a. building a construction platform on a rock foundation;
    b. sinking a lower end of a steel casing into the rock foundation; integrating the steel casing and the construction platform into a whole;
    c. setting a driller body at an upper end of the steel casing, enabling a rock-socketed driller bit of the driller body to drill in the rock foundation corresponding to the steel casing through an inner passage of the steel casing until reaching a design elevation;
    d. removing rock debris from the drilling hole and implanting the monopile prefabricated and arranged with a grouting system in the drilling hole;
    e. pouring underwater bottom-sealing concrete at the bottom of the monopile, and after the underwater bottom-sealing concrete is solidified, grouting the gap between the outer wall of the monopile and the hole wall of the drilling hole through the grouting system;
    f. removing the construction platform and the steel casing.

11. A construction method of the offshore non-driven in monopile foundation structure of claim 4, comprising:
    a. building a construction platform on a rock foundation;
    b. sinking a lower end of a steel casing into the rock foundation; integrating the steel casing and the construction platform into a whole;
    c. setting a driller body at an upper end of the steel casing, enabling a rock-socketed driller bit of the driller body to drill in the rock foundation corresponding to the steel casing through an inner passage of the steel casing until reaching a design elevation;
    d. removing rock debris from the drilling hole and implanting the monopile prefabricated and arranged with a grouting system in the drilling hole;
    e. pouring underwater bottom-sealing concrete at the bottom of the monopile, and after the underwater bottom-sealing concrete is solidified, grouting the gap between the outer wall of the monopile and the hole wall of the drilling hole through the grouting system;

f. removing the construction platform and the steel casing.

12. A construction method of the offshore non-driven in monopile foundation structure of claim 5, comprising:
  a. building a construction platform on a rock foundation;
  b. sinking a lower end of a steel casing into the rock foundation; integrating the steel casing and the construction platform into a whole;
  c. setting a driller body at an upper end of the steel casing, enabling a rock-socketed driller bit of the driller body to drill in the rock foundation corresponding to the steel casing through an inner passage of the steel casing until reaching a design elevation;
  d. removing rock debris from the drilling hole and implanting the monopile prefabricated and arranged with a grouting system in the drilling hole;
  e. pouring underwater bottom-sealing concrete at the bottom of the monopile, and after the underwater bottom-sealing concrete is solidified, grouting the gap between the outer wall of the monopile and the hole wall of the drilling hole through the grouting system;
  f. removing the construction platform and the steel casing.

13. A construction method of the offshore non-driven in monopile foundation structure of claim 6, comprising:
  a. building a construction platform on a rock foundation;
  b. sinking a lower end of a steel casing into the rock foundation; integrating the steel casing and the construction platform into a whole;
  c. setting a driller body at an upper end of the steel casing, enabling a rock-socketed driller bit of the driller body to drill in the rock foundation corresponding to the steel casing through an inner passage of the steel casing until reaching a design elevation;
  d. removing rock debris from the drilling hole and implanting the monopile prefabricated and arranged with a grouting system in the drilling hole;
  e. pouring underwater bottom-sealing concrete at the bottom of the monopile, and after the underwater bottom-sealing concrete is solidified, grouting the gap between the outer wall of the monopile and the hole wall of the drilling hole through the grouting system;
  f. removing the construction platform and the steel casing.

* * * * *